United States Patent [19]
Tzeng et al.

[11] Patent Number: 5,617,270
[45] Date of Patent: Apr. 1, 1997

[54] TAPE WINDING LINKAGE OF MAGNETIC RECORDING AND REPRODUCING APPARATUS

[75] Inventors: Jaw-Horng Tzeng, Kaohsiung; Ming-Jer Chiu, Hsinchu; Yii-Wei Hwang; Wei-Chi Chang, both of Chiai, all of Taiwan

[73] Assignee: Industrial Technology Research Institute, Hsinchu Hsien, Taiwan

[21] Appl. No.: 391,849

[22] Filed: Feb. 22, 1995

[51] Int. Cl.$^6$ .................................................. G11B 5/027
[52] U.S. Cl. .................................................. 360/85
[58] Field of Search .................................. 360/85, 95

[56] References Cited

U.S. PATENT DOCUMENTS 5,475,546  12/1995  Choi ........................................ 360/95
5,490,019  2/1996   Konishi et al. ......................... 360/95

FOREIGN PATENT DOCUMENTS

57-78671  5/1982  Japan ...................................... 360/95

Primary Examiner—Stuart S. Levy
Assistant Examiner—Allen Cao
Attorney, Agent, or Firm—W. Wayne Liauh

[57] ABSTRACT

An improved tape winding linkage is disclosed. It comprises: (a) a deck, a gear shaft, a tape loading gear, and a guiding slot formed on the deck; (b) a first link having first and second joints, the first link being connected to the gear shaft at the first joint thereof; (c) a second link having first, second, and third joints, wherein the second link is divided into a first portion and a second portion intersecting at an angle at the second joint of the second link, and the second link further comprises a guiding pin located at the an under surface of the second joint to be received by and slide along the guiding slot of the deck; (d) a third link having first and second joints; (e) an inclined pole base connected to the third link at the second joint of the third link; and (f) an inclined pole base guiding pin provided at an under surface of the inclined pole base to be received by and slide along the guiding slot of the deck. The unique design of the second link allows the winding linkage to be assembled without a torsion spring, which is always required in convention devices between the first link and the gear shaft.

5 Claims, 13 Drawing Sheets

Fig. 1

PRIOR ART

TAPE WINDING LINKAGE OF MAGNETIC RECORDING AND REPRODUCING APPARATUS

FIELD OF THE INVENTION

The present invention relates to a tape loading linkage for magnetic recording and reproducing apparatus that possesses advantages of simplified transmission members, reduced space, and ease of assembly.

1. Background of the Invention

Currently, all the commercially available tape winding linkages for magnetic recording and reproducing apparatus contain a set of three links connected in series, i.e., the first, second, and third link, all of them being straight segments with two-joint links. A tape loading torsion spring is attached between the first link and the tape loading gear such that one end of the torsion spring connects to the tape loading gear and the other end tightly presses against the first link after being preloaded. As both of the tape loading gears and tape loading links are driven by the power source, the inclined pole base moves at the positions of the tape loading and unloading and along the deck slot, thereby diverting the tape out of the cassette and winding around the drum. However, this type of structure requires a relatively large number of elements which make the assembling procedure very complicated and, thereby, is inconvenient and space consuming.

2. Summary of the Invention

The main object of the invention is to provide an improved tape winding linkage for magnetic recording and reproducing apparatus wherein the tape loading torsion spring between the tape loading gear and the first link can be eliminated to simplify the machine members and reduce manufacturing costs. Also, the second link in the present invention is a link with three joints forming an angle. By use of the guided pin, provided in the second link and the third pivot joint, the inclined pole base slides between the tape loading and unloading positions, along the deck slot, such that the inclined pole on the inclined pole base can smoothly divert the tape out of the cassette and wind around the drum.

The next object of the invention is to disclose an improved tape winding linkage for magnetic recording and reproducing apparatus wherein either the second link or the third link possesses a spring effect, and by use of the spring action of the second or the third link, it generates a tight pressing force against the drum base.

Another object of this invention is to provide an improved integrated tape winding linkage which combines the first link and the tape loading gear so as to further cut the manufacturing cost and simplify the assembling process.

The present invention will be described in detail with reference to the drawings showing the preferred embodiment of the present invention, wherein:

DETAILED DESCRIPTION OF THE INVENTION

Figure 1:
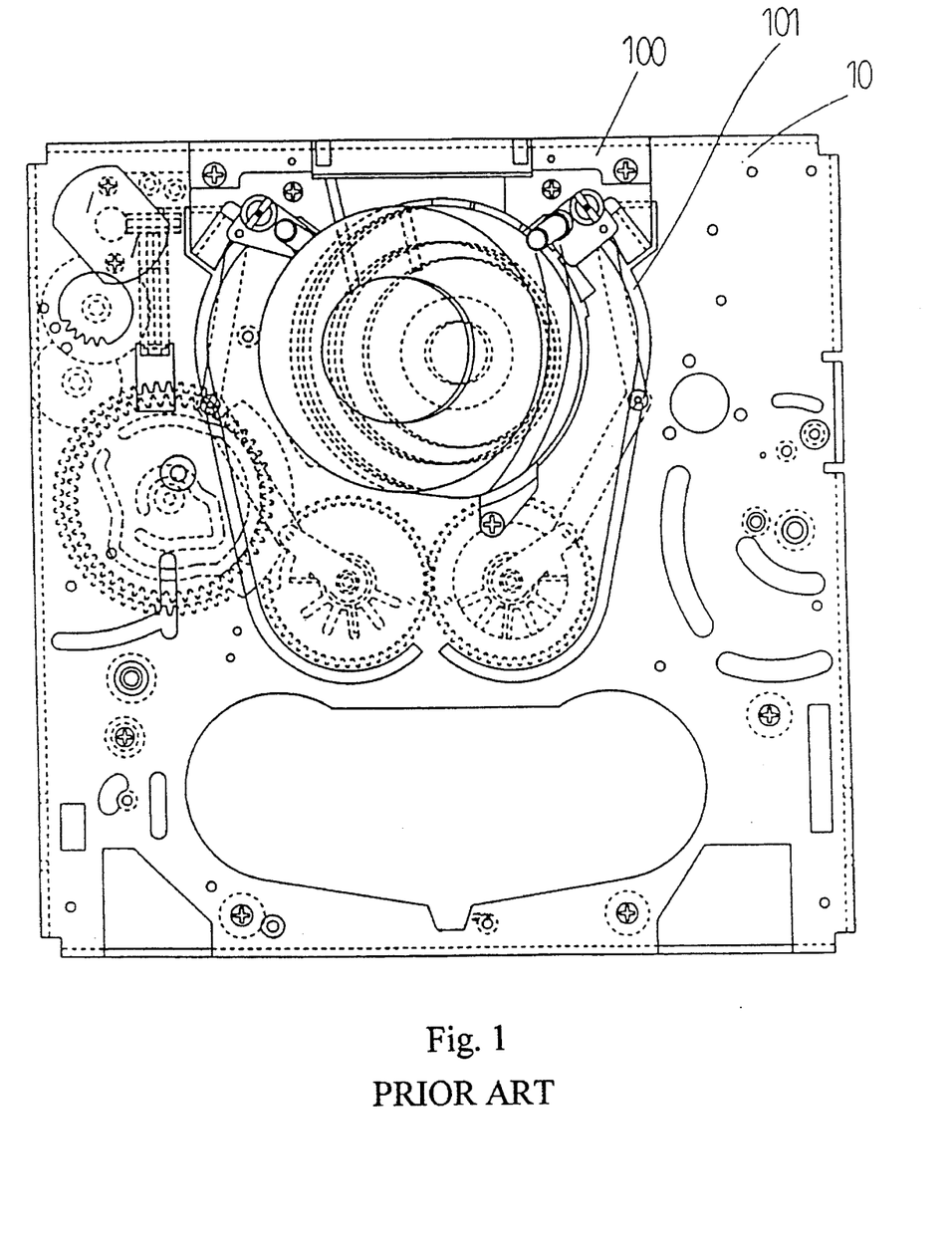
FIG. 1 is a general layout of a traditional tape winding linkage.
Figure 2A:
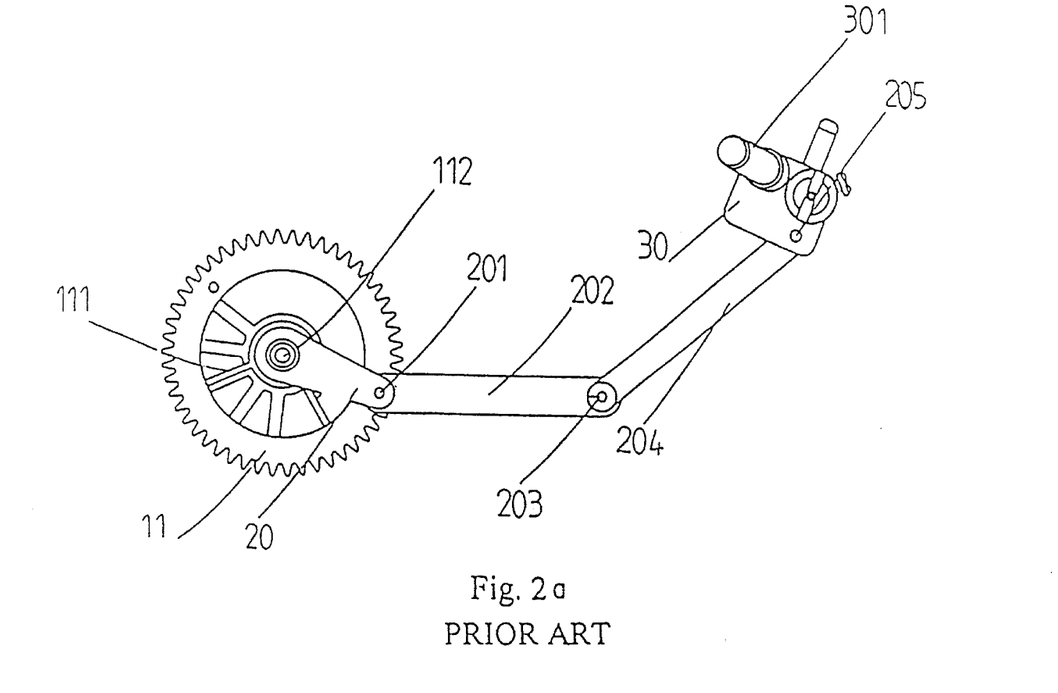
FIG. 2 is an assembled structure of a traditional tape winding linkage.
Figure 2B:
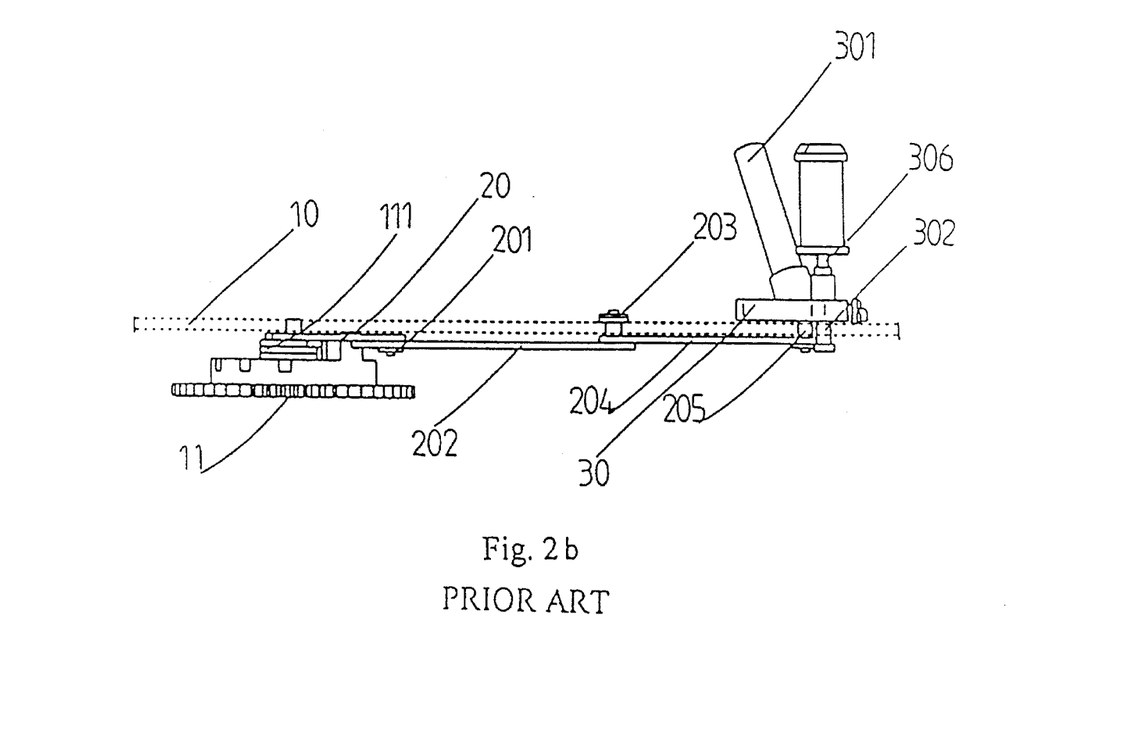
Figure 3:
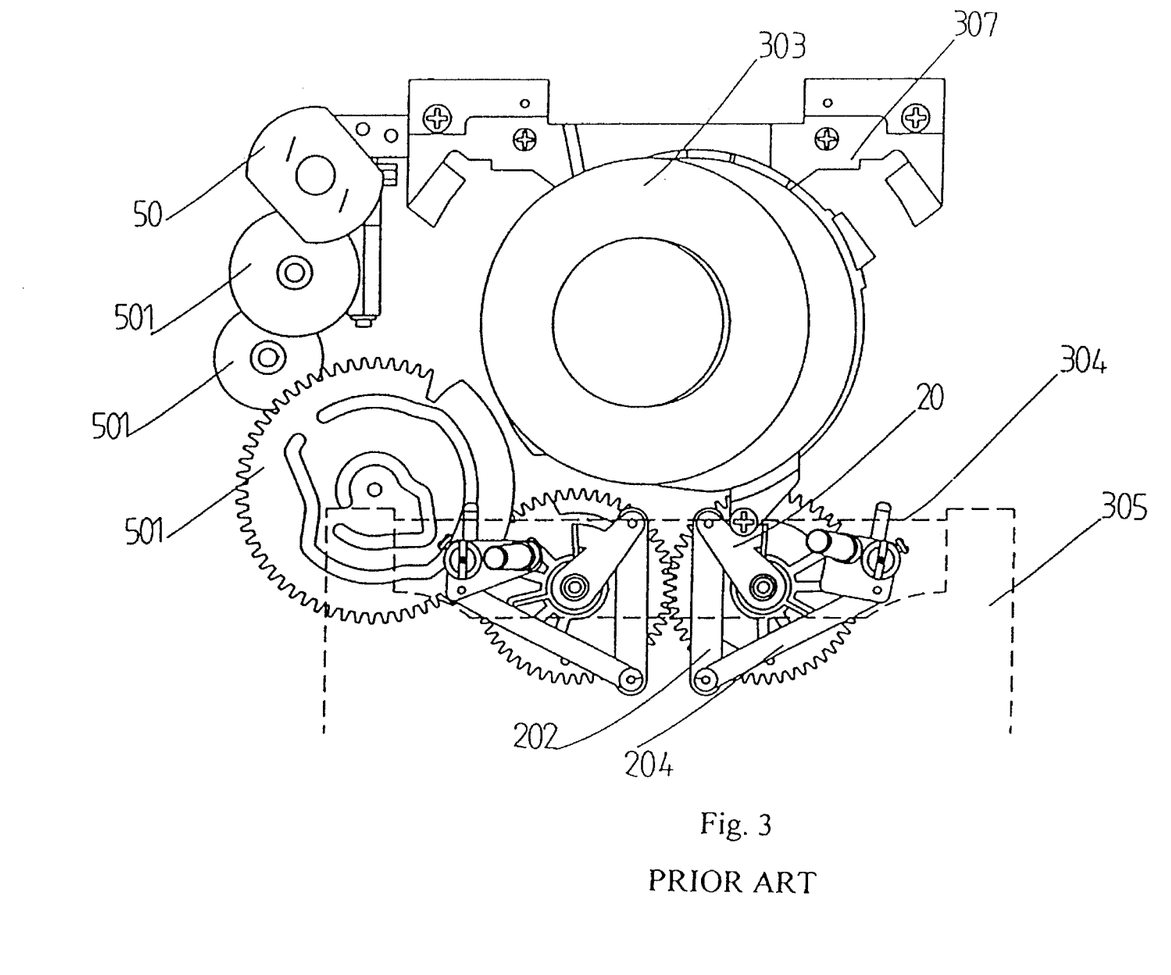
FIG. 3 is a schematic diagram of a traditional tape winding linkage at the tape unloading position thereof.
Figure 4:
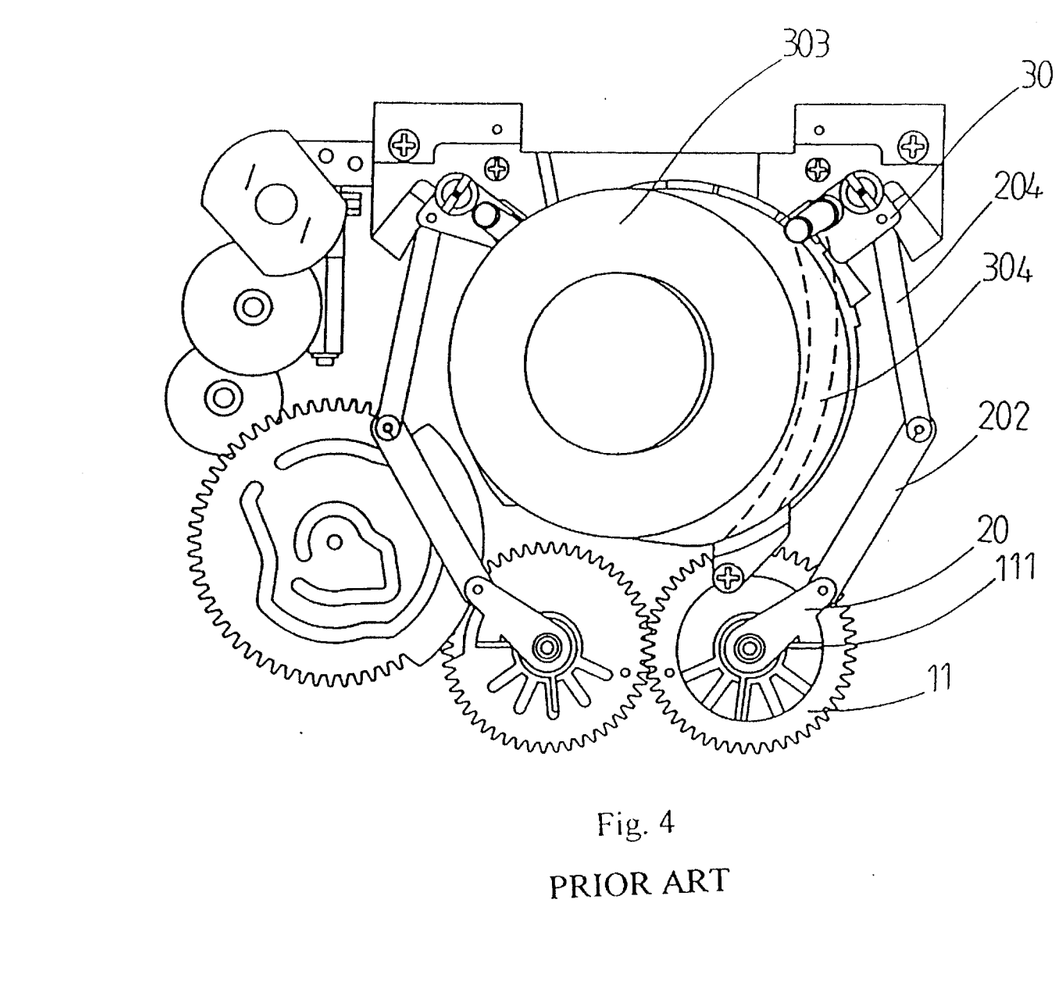
FIG. 4 is a schematic diagram of a traditional tape winding linkage at the tape loading position thereof

Referring to FIG. 1, which shows a general layout of a traditional tape winding linkage, in conjunction with FIG. 2, which is an assembled structure diagram, the tape loading linkage is divided into two pans, the left and the fight pans, both of them are attached to deck 10. Among them, there is a tape loading torsion spring 111 installed between the first link 20 and the tape loading gear 11 with the first end of the tape loading torsion spring attached to the tape loading gear 11, and its second end pressed against the first link 20 after being preloaded. Then, the second link 202 is connected to the first link 20 with the first pivot joint 201 at a first end and is connected to the third link 204 with the second pivot joint 203 at a second end. Finally, the third link 204 is connected to the inclined pole base 30 with the third pivot joint 205 at its first end. Also, the third pivot joint 205, the guided pin 302 of the inclined pole base as well as the second pivot joint 203, are all embedded in the guided slot 101 of the deck. By means of these components, the left and fight inclined pole base 30 will move along the guided slot 101 of the deck between the tape unloading and loading positions (as shown in FIG. 3 and FIG. 4) when the motor 50 drives the gearing series 501, thereby diverting the magnetic tape 304, contained in the cassette 305, onto the tape loading position and wind around the drum 303 by use of the inclined pole on top of the inclined pole base. At this moment, the guided roller stopper 306 of the inclined pole base 30 will up-touch the inclined pole base stopper 307 of the drum base 100 and constrain the inclined pole base 30 and linkage to stop moving. In the meantime, the tape loading gear 11 continues to rotate at angle θ to drive the tape loading torsion spring 111 to increase the magnitude of torsion, thereby making the inclined pole base 30 press tightly against the drum base 100.

According to the foregoing statements, the tape loading gear 11 of the traditional tape winding linkage consists of three layers of structure and it must be assembled in accordance with the following procedures:

1. Attach the first link 20 at the gear shaft 112 of deck 10;

2. Install the tape loading torsion spring 111, and at the first end, press it tightly against the first link 20;

3. Install the tape loading gear 11, and fix on it the second end of the tape loading torsion spring 111;

4. Align the left and right tape loading gears to the correct phase angle.

It is not easy to do a good job in assembling the tape loading gear and the phase angle alignment because the assembly work is tedious due to the three layers of the structure and the spring action of the torsion spring in the middle being tightly pressing.

Figure 5:
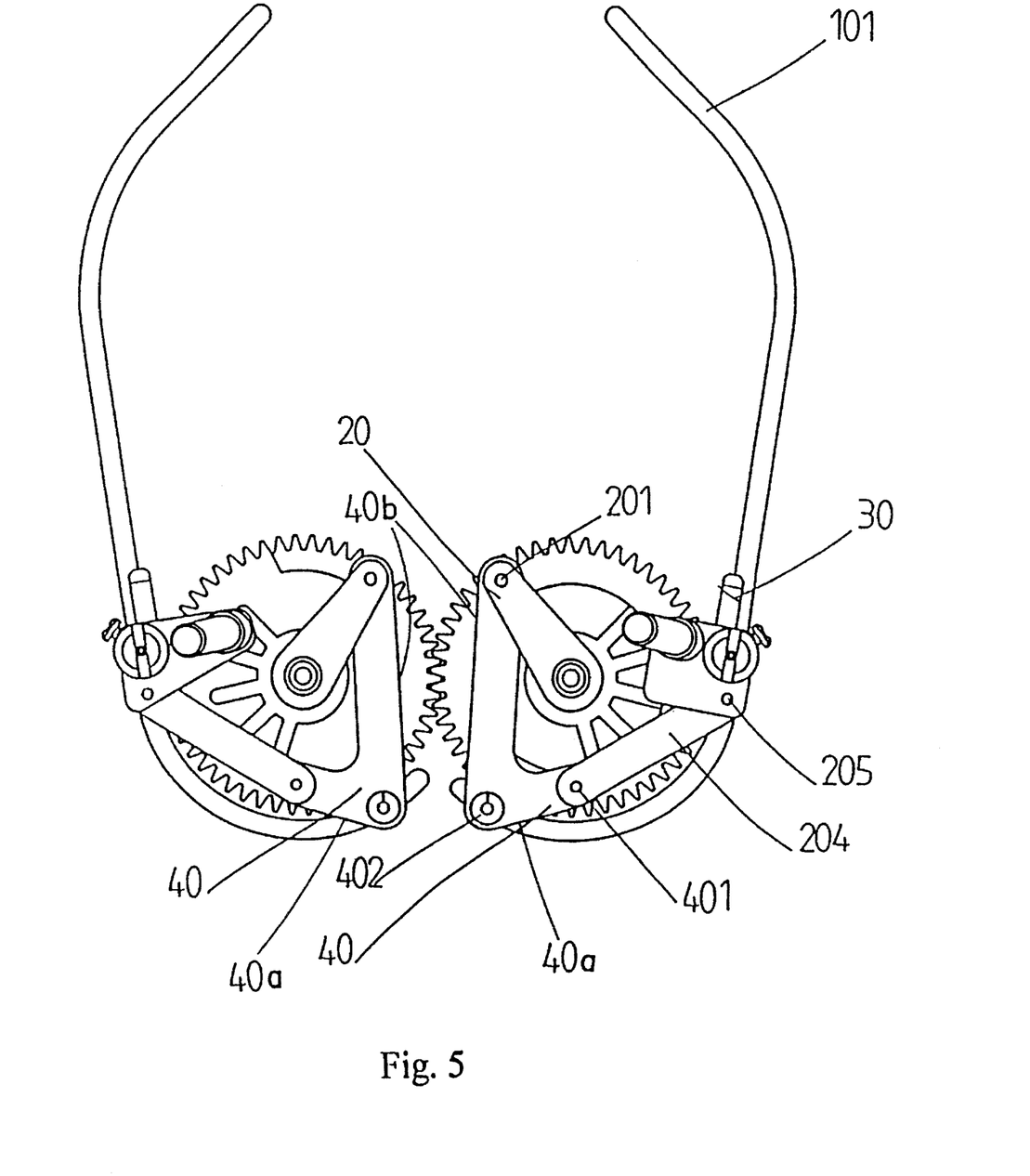
FIG. 5 is a schematic diagram of the tape winding linkage of the present invention at the tape unloading position thereof.
Figure 6:
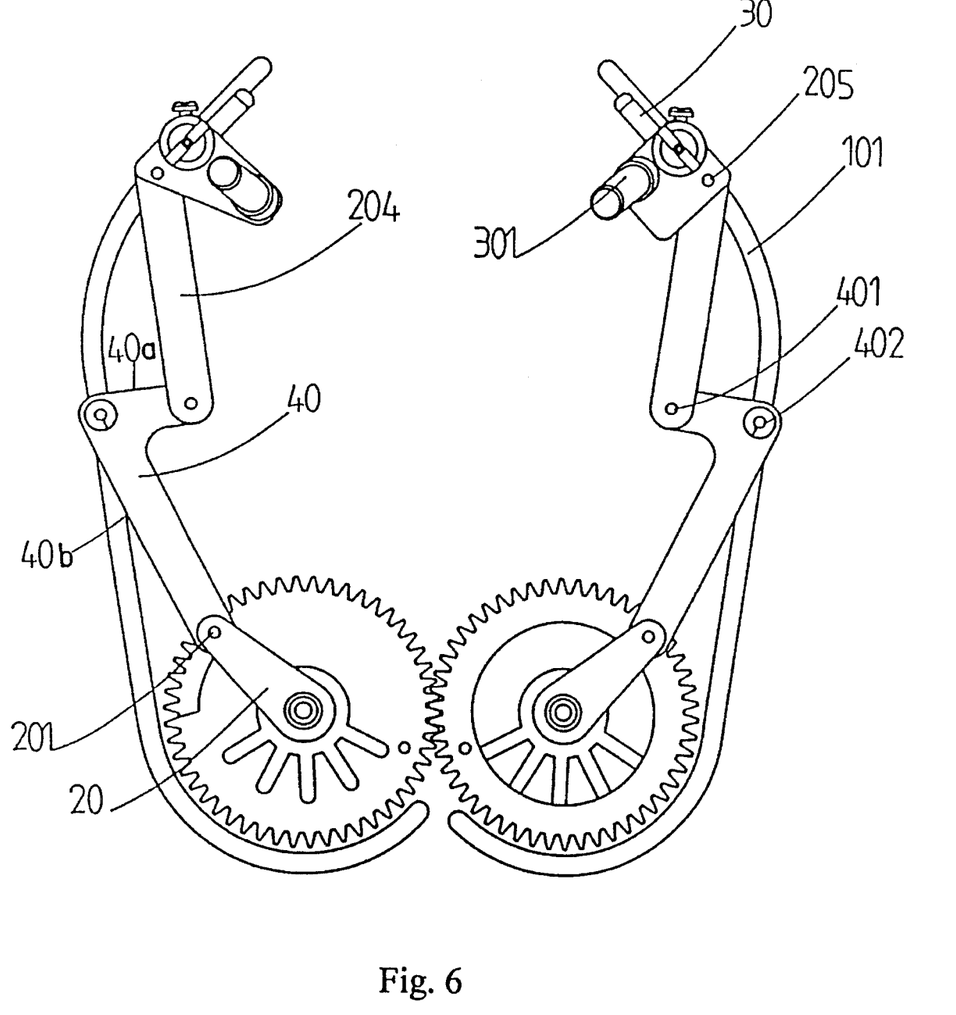
FIG. 6 is a schematic diagram of the tape winding linkage of the present invention at the tape loading position thereof.

FIG. 5 is the schematic diagram of the tape winding linkage of the present invention at the tape unloading position thereof. In the present invention, there is no need to install the tape loading torsion spring 111 between the first link 20 and tape loading gear 11. The second link 40, being a link with three joints, is connected to the first link 20 with the first pivot joint 201, to the third link 204 with the second pivot joint 401, and is also embedded in the guided slot 101 of the deck with the guided pin 402 of the second link. In other words, the second link 40 is formed by a first portion 40a and a second portion 40b, intersection at an angle. This is a key element of the present invention as distinguished from all other prior art linkages, in which the second element is always formed as a straight portion. The bent construction of the present invention allows the first and second links to be always pulled in the right direction, when a cassette is being loaded, without requiring the torsion spring. The guided pin 402 is located at the third joint of the second link such that the three joints 201, 401, and 402' form an angle. The third link 204 is connected to the inclined pole base 30 by the third pivot joint 205. The inclined pole base 30 moves along the guided slot 101 of the deck by means of the guided pin 402 of the second link, the third pivot joint 205, and inclined base guided pin 302. As the power linkage is driving, it causes the inclined pole base 30 to move between the tape unloading and tape loading positions along the guided slot 101 of the deck (as shown in FIG.6), thereby diverting the magnetic tape 304 out from within the cassette and winding around the drum 303.

After the structure of the present invention is stated as above, the installation procedures of the tape loading gear 11 are:

1. Install the first link 20 at the gear shaft 112 on deck 10;

2. Attach tape loading gear 11;

3. Align the correct phase angle.

Figure 7:
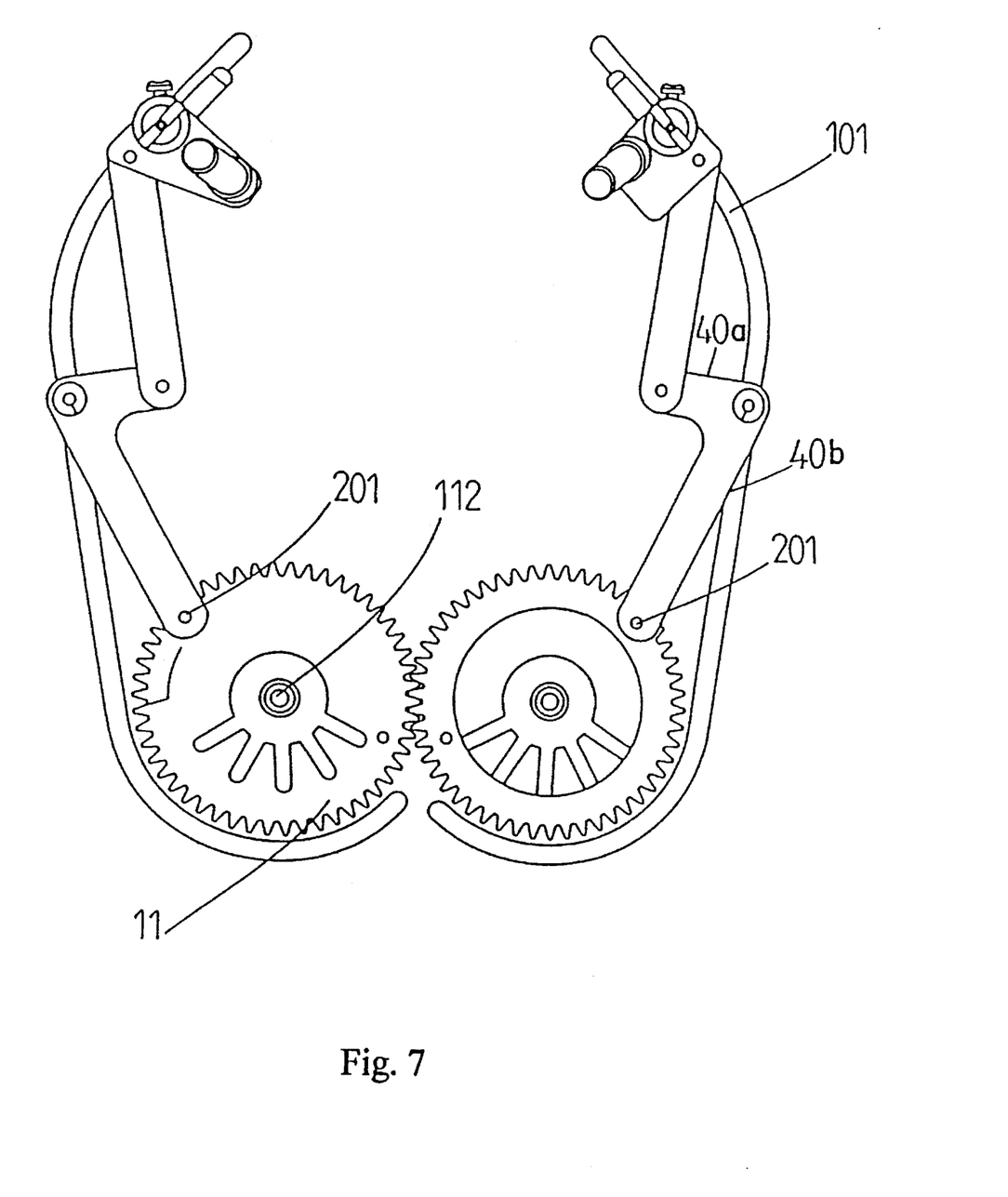
FIG.7 is a first embodiment of the present invention.

FIGS. 5–7 show that the second link 40 comprises a first portion 40a and a second portion 40b. The first and second portions of the second link form an angle and intersect at the third joint 402. This feature allows the first link to be pulled always in the right direction without the need for a torsion spring.

As the need for a tape loading torsion spring 111 is eliminated during assembling, and there are only two layers in the structure, it can save space and be assembled quickly. Also, because the first link 20 and tape loading gear 11 have no relative motion and are in synchronized rotation, they can be formed into a shape to become a single assembly which make the assembly process easier. It can further eliminate the first link 20 by attaching the first pivot joint 201 directly to the gear surface of the tape loading gear and making use of the radius from the gear shaft 112 to act as the first link 20 as shown in FIG. 7. Thereby, the tape loading gear can serve also as the first link 20 which can further save space and make the assembly work much easier.

Figure 8:
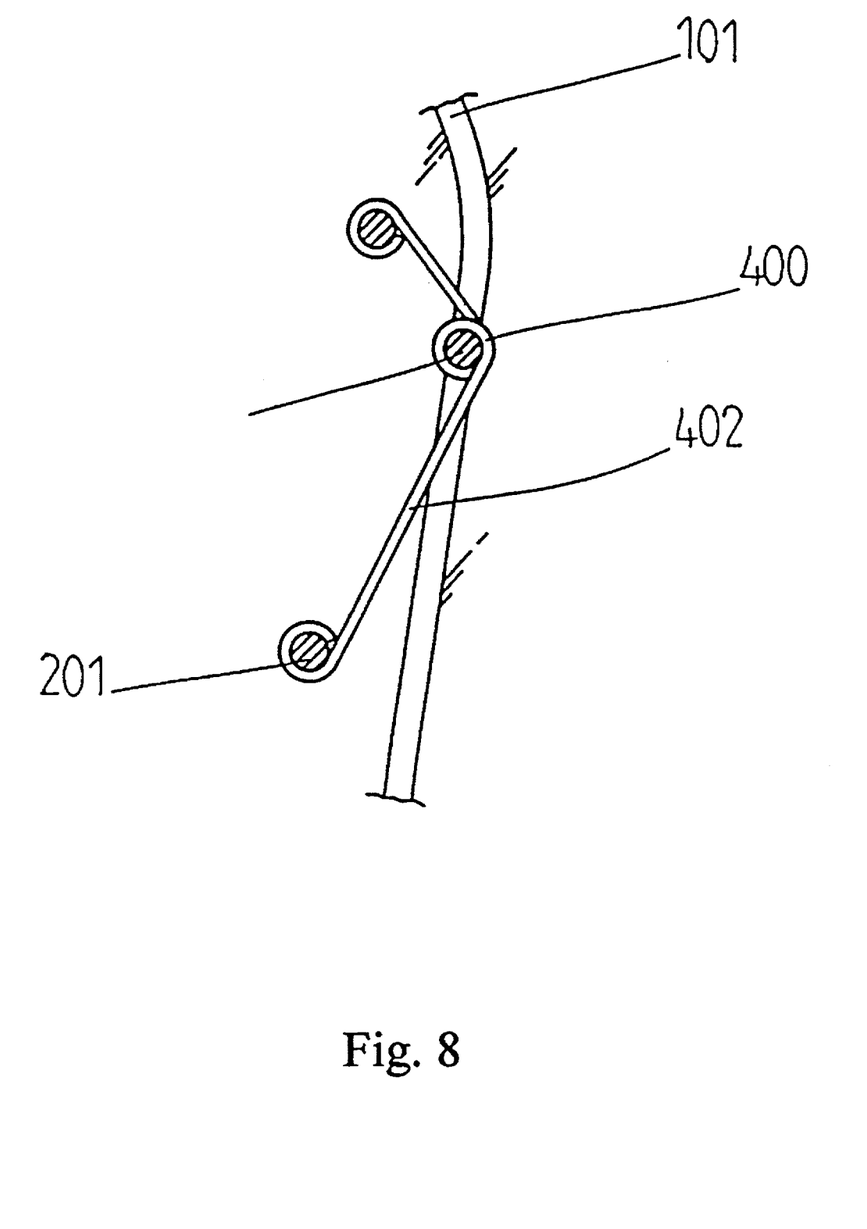
FIG. 8 is a structural schematic diagram of the second link of the second embodiment of the present invention.
Figure 9:
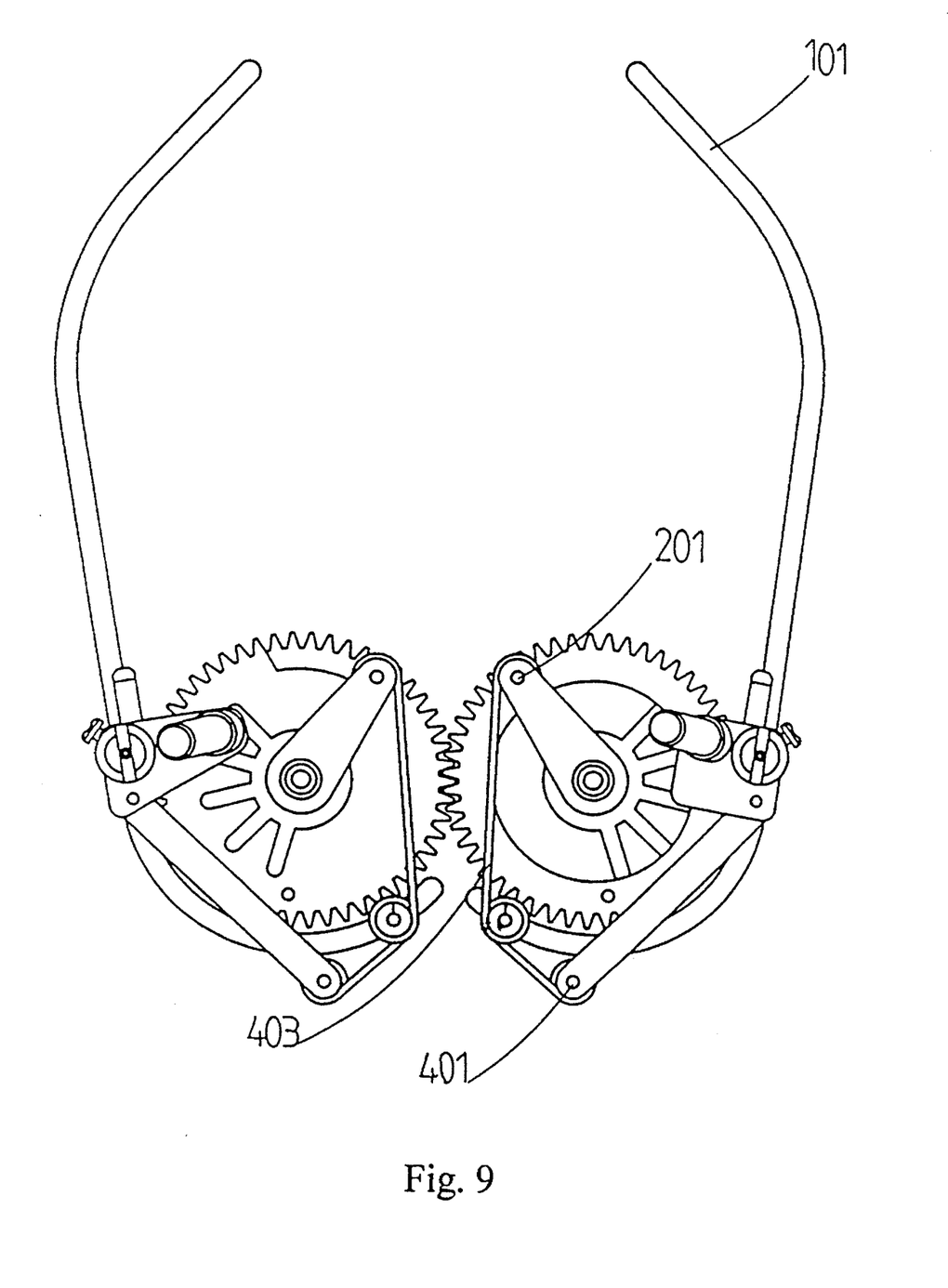
FIG.9 is a schematic diagram of the second embodiment of the present invention at the tape unloading position thereof.
Figure 10:
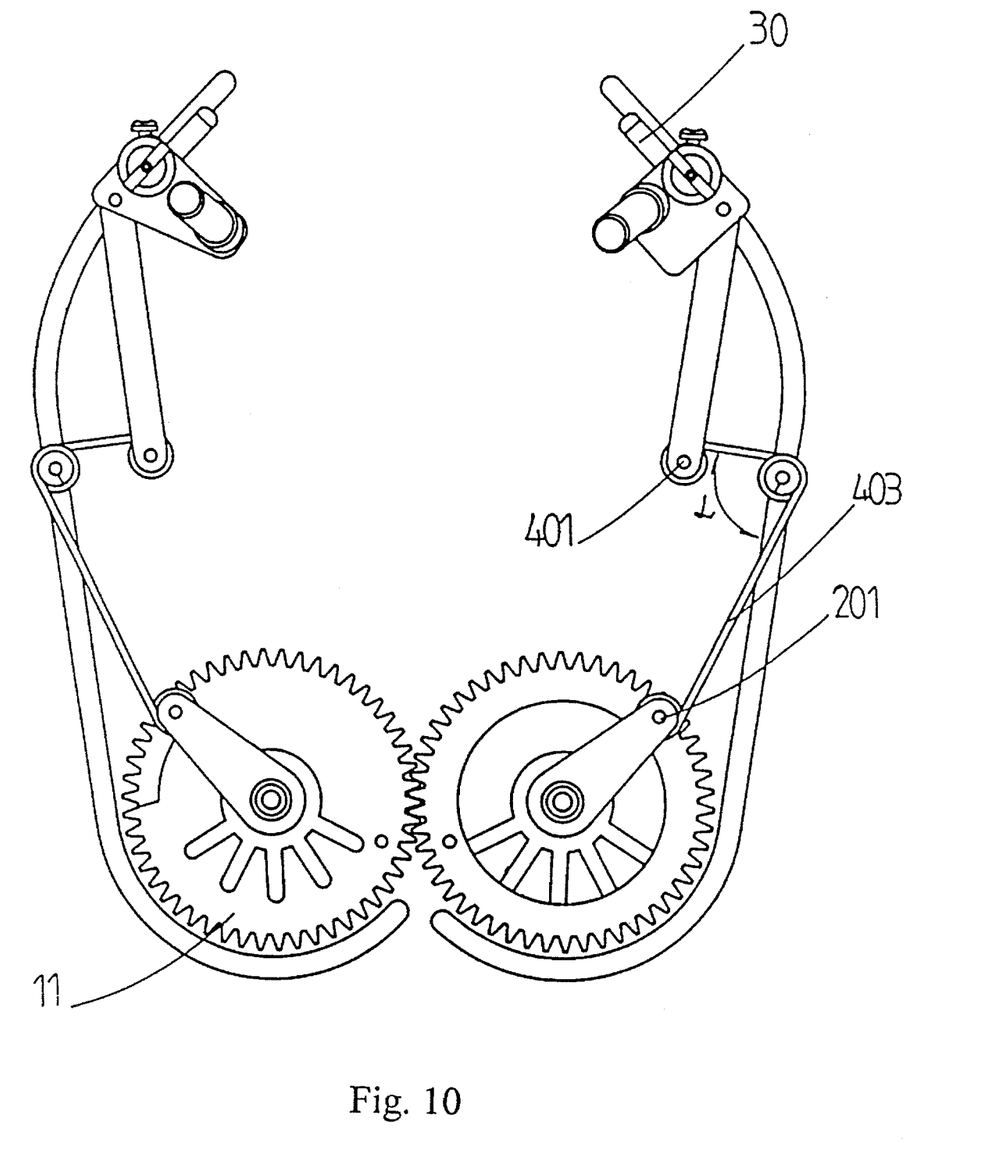
FIG. 10 is a schematic diagram of the second embodiment of the present invention at the tape loading position thereof.

Referring again to FIG. 8, the structural schematic diagram of the second link of the second embodiment of the present invention, the second spring link 403, which has three joints and possessing a spring effect, is connected to the guided pin 402 of the second link at the spiral part 400 and the guided pin 402 of the second link also embedded in the guided slot 101 of the deck. Referring also to FIG. 9 and FIG. 10, the schematic diagram of the second embodiment of the present invention at the tape unloading and loading positions to make a comparison, as the linkage is moving from tape unloading position to tape loading position, the second spring link 403 is in a free state of unloading until the inclined pole base 30 touches the drum base 100. The inclined pole base 30 stands still without moving, but the tape loading gear 11 keeps on turning at angle θ, thereby the first and second pivot joints 201 and 401 are subjected to force acting such that the second spring link 403 creates angular deformation in the θ-direction to provide torsion spring force which makes the inclined pole base 30 tightly pressed against the drum base 100.

Figure 11A:
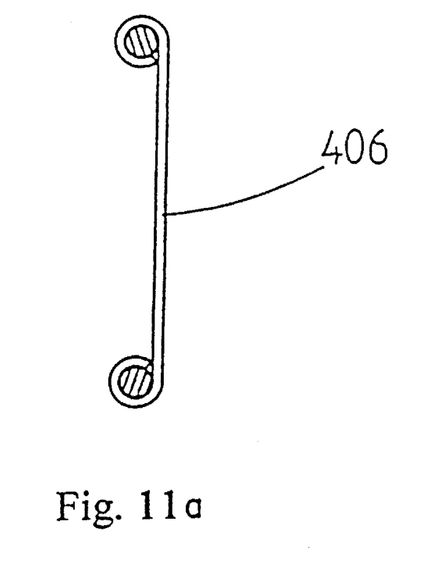
FIG. 11 is a structural schematic diagram of the third link of the third embodiment of the present invention.
Figures 11B, 11C:
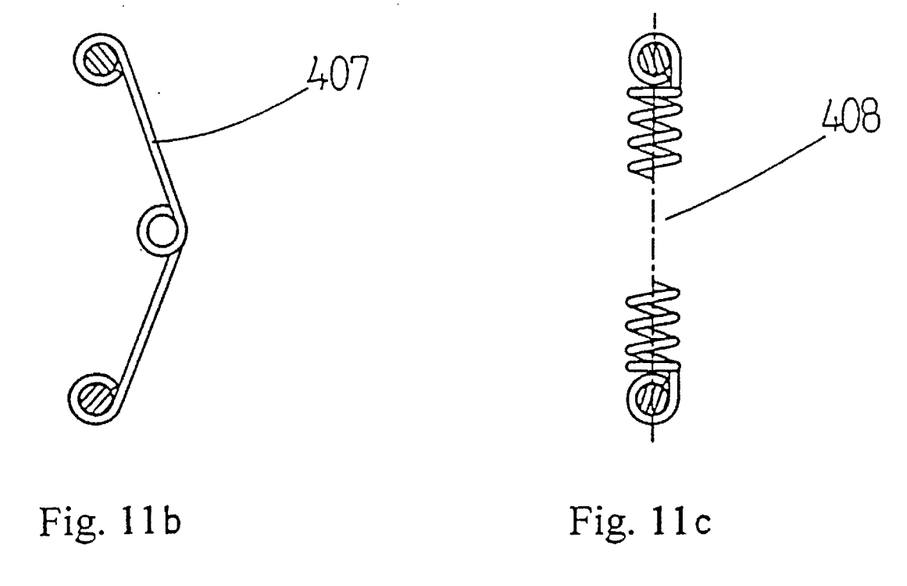
Figure 12:
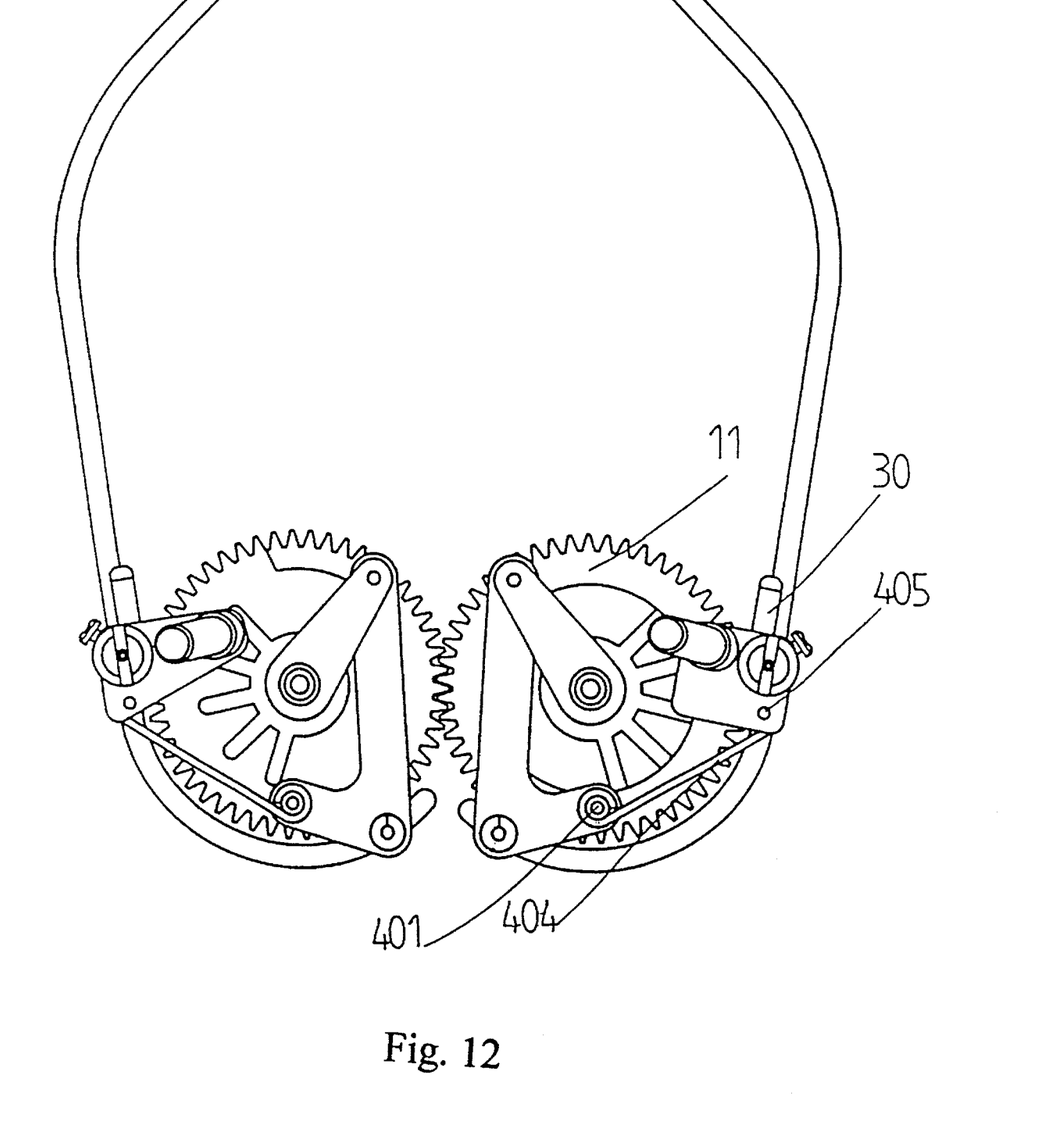
FIG. 12 is a schematic diagram of the third embodiment of the present invention at the tape unloading position thereof.
Figure 13:
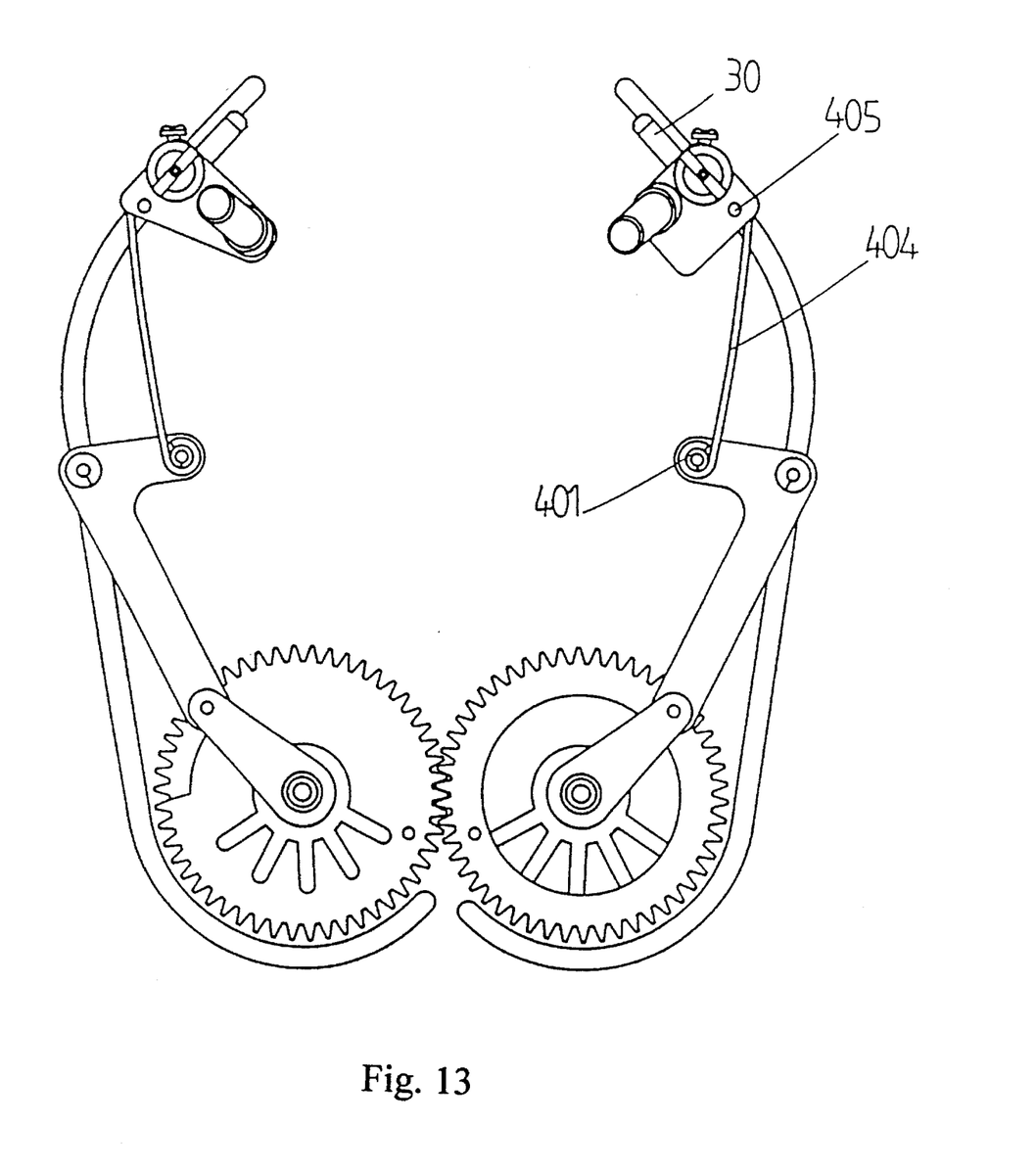
FIG. 13 is a schematic diagram of the third embodiment of the present invention at the tape loading position thereof.

FIG. 11 shows the structural schematic diagram of the third link of the third embodiment of the present invention. The third spring link 404 possessing spring effect and having two joints can be a buckling type two-joint link 406 or a torsional spring type two-joint link 407 or a compressing spring type two-joint link 408. Referring to FIG. 12 and FIG. 13, the schematic diagram of the third embodiment of the present invention at the tape unloading and loading positions to make a comparison, as the linkage is moving from the tape unloading position to the tape loading position, the third spring link 404 is in a free state of unloading until the inclined pole base 30 touches the drum base 100. The inclined pole base 30 stands still without moving, but the tape loading gear 11 keeps on turning at angle θ, which make the second and third pivot joints 401 and 405 compress the third spring link 404, and thereby creating a predetermined pressing force against each other, between the inclined pole base 30 and drum base 100.

According to the foregoing statements, the present invention actually possesses the following advantages:

1. Simplifying the machine elements of the tape winding linkage;

2. Increasing the conveniency of assembly work; and

3. Lowering the cost.

To summarize the foregoing statements, it is understood that the present invention possesses practicality and originality. It is not found in any publications, thereby, is in accordance with the patentability.

Although the present invention has been illustrated and described previously with references to the preferred embodiments thereof, it should be appreciated that it is in no way limited to the details of such embodiments, but is capable of numerous modifications within the scope of the appended claims.

What is claimed is:

1. A kind of tape winding linkage of magnetic recording and reproducing apparatus comprising:

(a) a deck, a gear shaft mounted thereon, a tape loading gear embedded in said gear shaft, and a guiding slot formed on said deck;

(b) a first link having first and second joints, said first link being connected to said gear shaft at said first joint thereof;

(c) a second link having first, second, and third joints, wherein said second link is divided into a first portion and a second portion, and said first and second portions intersect an angle at said second joint of said second link, further wherein said first portion of said second link is connected to said first link at said first joint of said second link, and said second link further comprises a guiding pin located at an under surface of said second joint to be received by and slide along said guiding slot of said deck;

(d) a third link having first and second joints, and said second portion of said second link being connected to said third link at said third joint of said second link and said first joint of said third link;

(e) an inclined pole base connected to said third link at said second joint of said third link; and (f) an inclined pole base guiding pin provided at an under surface of said inclined pole base to be received by and slide along said guiding slot of said deck.

2. The tape winding linkage for magnetic recording and reproducing apparatus according to claim 1 wherein said second link is constructed to possess a spring effect.

3. The tape winding linkage for magnetic recording and reproducing apparatus according to claim 1 wherein the first and second joints of said third link are of a selected from it group consisting of buckling type, torsional type, and compressing type, all of which possess a spring effect.

4. The tape winding linkage for magnetic recording and reproducing apparatus according to claim 1 wherein said first link is integrated with said tape loading gear.

5. The tape winding linkage for magnetic recording and reproducing apparatus according to claim 4 wherein said first joint of said first link is attached to a gear surface of said tape loading gear and said first link is structured as a gear radius extending from said first joint of said first link to said gear shaft.

* * * * *